(12) United States Patent
Lux

(10) Patent No.: US 12,496,017 B1
(45) Date of Patent: Dec. 16, 2025

(54) REMOVAL OF CARDIAC AND RESPIRATORY MOTION FROM GEOMETRIC POINTS ACQUIRED FROM CARDIAC CATHETER ELECTRODES

(71) Applicant: Neucures Inc., Los Angeles, CA (US)

(72) Inventor: Robert L Lux, Park City, UT (US)

(73) Assignee: Anumana, Inc., Cambridge, MA (US)

( * ) Notice: Subject to any disclaimer, the term of this patent is extended or adjusted under 35 U.S.C. 154(b) by 691 days.

(21) Appl. No.: 17/805,687

(22) Filed: Jun. 6, 2022

Related U.S. Application Data

(60) Provisional application No. 63/197,391, filed on Jun. 5, 2021.

(51) Int. Cl.
| | |
|---|---|
| *A61B 5/00* | (2006.01) |
| *A61B 5/06* | (2006.01) |
| *A61B 5/113* | (2006.01) |
| *A61B 5/283* | (2021.01) |
| *A61B 5/367* | (2021.01) |

(52) U.S. Cl.
CPC .............. *A61B 5/721* (2013.01); *A61B 5/065* (2013.01); *A61B 5/113* (2013.01); *A61B 5/283* (2021.01); *A61B 5/367* (2021.01); *A61B 5/6852* (2013.01)

(58) Field of Classification Search
CPC ......... A61B 5/721; A61B 5/065; A61B 5/113; A61B 5/283; A61B 5/367; A61B 5/6852
See application file for complete search history.

(56) References Cited

U.S. PATENT DOCUMENTS

| | | | | |
|---|---|---|---|---|
| 10,820,829 | B2* | 11/2020 | Denissen | A61B 5/7246 |
| 10,874,320 | B2* | 12/2020 | Klebanov | G06F 3/04883 |
| 2020/0229767 | A1* | 7/2020 | Eletr | A61B 5/0261 |

\* cited by examiner

*Primary Examiner* — Carl H Layno
*Assistant Examiner* — Bryan McAllister Lee
(74) *Attorney, Agent, or Firm* — Caldwell Intellectual Property Law

(57) ABSTRACT

A method for processing at least one electrical signal received from a mapping catheter electrode during cardiac mapping of a patient's heart is disclosed. The method comprises processing the at least one electrical signal to identify a heartbeat in the signal at a time t; analyzing a portion of the at least one electrical signal prior to the detected heartbeat to identify a time t' when motion of the mapping catheter electrode is at a minimum; and selecting a catheter position for the heartbeat as the position of the catheter at the time t'.

19 Claims, 6 Drawing Sheets

REMOVAL OF CARDIAC AND
RESPIRATORY MOTION FROM
GEOMETRIC POINTS ACQUIRED FROM
CARDIAC CATHETER ELECTRODES

FIELD

Embodiments of the present invention relate to cardiac mapping.

BACKGROUND

During electrophysiological (EP) procedures to study and treat patients with cardiac arrhythmias, cardiologists insert catheters with electrodes into the heart cavities and on the heart surfaces. While moving the catheter and its electrodes around the regions, electronic systems acquire both electrical signals from the heart (electrograms or EGs) from the electrodes as well as the locations of the electrodes in three dimensional (3D) coordinates. The locations or points, e.g. Pn(Xn,Yn,Zn) is the nth point and has coordinates Xn, Yn, and Zn. These points for a point cloud that is used to form a surface that looks like the heart cavity or surface that is being studied. To generate the surface, the points are triangulated and special software allows data at the points to be presented on the surface. FIG. 1A shows a point cloud 102 and connecting triangles and FIG. 1B shows a shaded surface 104 that could show data measured from the EGMs.

A significant problem is that electrodes on and within the heart move throughout every heartbeat and every respiratory cycle. During each heartbeat, the heart contracts and relaxes as the blood is ejected from the heart and then refills the heart. During each respiratory cycle the lungs fill with air during inspiration and empty during expiration. These combined motions introduce a variation of the electrode position by as much as ±2.0 cm and leads to both variation in the geometric surface that is generated, as well as distracting, continuous motion of the catheter's position that is continuously monitored during the procedure.

BRIEF SUMMARY

According to one aspect of the invention there is provided a system and method for tracking electrode trajectories in 3D, and to detect the cardiac motion and then the respiratory motion. These trajectories in time show and delineate the cardiac contraction and filling as well as the respiratory inspiration and expiration.

According to the techniques disclosed herein, points are selected just prior to contraction of the heart for each heartbeat. This leaves a trajectory of points with cardiac motion eliminated and shows the surface of the heart during maximum filling (called end diastole). Advantageously, the stable coordinates with cardiac motion removed provide a signal that clearly shows inspiration and expiration during each respiratory cycle. Coordinates may be selected just prior to inspiration, a time when the chest and motion of the heart in the chest are moving the least.

In one embodiment, for both the cardiac and respiratory analyses, the electrode velocity provides a clear signal showing when the motion is greatest and least, thus allowing for selection of electrode coordinates at times of least motion arising from cardiac and respiratory cycles.

In one embodiment, optimally selected point coordinates may be up-sampled (interpolated) in time to provide higher spatial resolution for model building.

Other aspects of the invention will be apparent from the detailed description below.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1A:
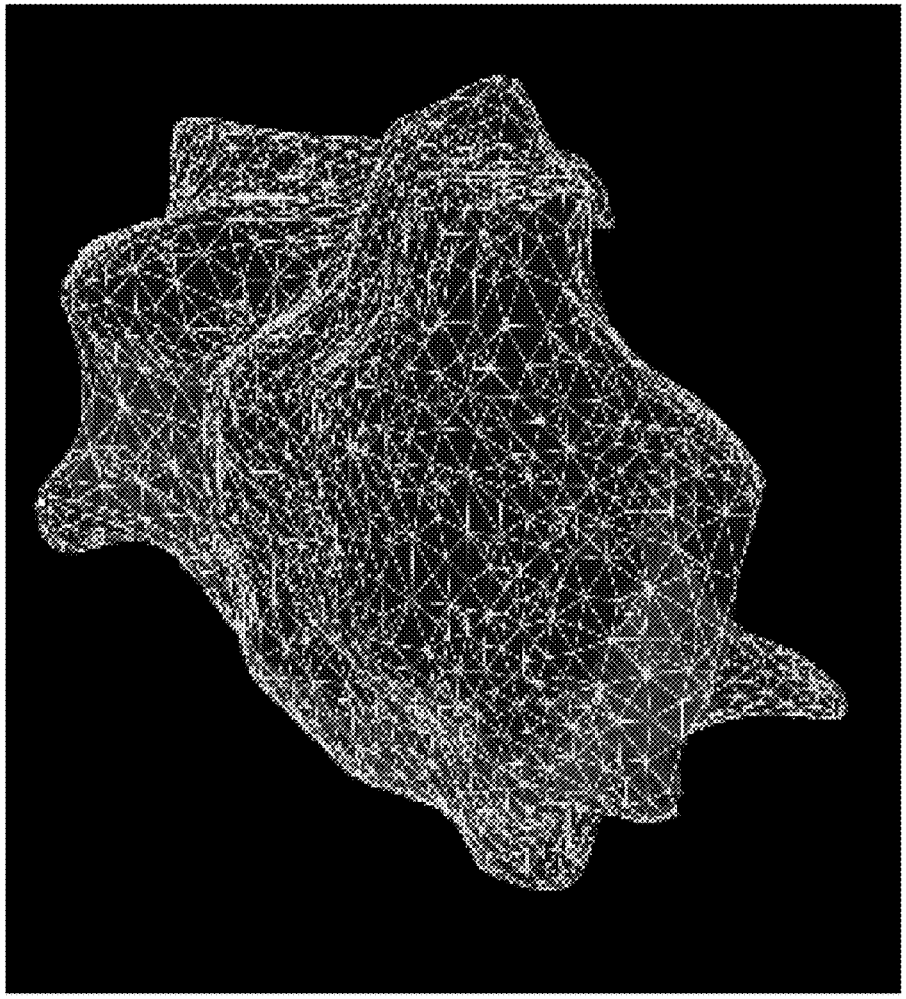
FIG. 1A shows a 3D mesh model for a heart.

The phrases "in one embodiment", "in various embodiments", "in some embodiments", and the like are used repeatedly. Such phrases do not necessarily refer to the same embodiment. The terms "comprising", "having", and "including" are synonymous, unless the context dictates otherwise.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to or combined, without limiting the scope to the embodiments disclosed herein.

Embodiments of the present invention disclose isolation of the local depolarization wave as measured by each electrode from the "far field" part of the EGM signal, i.e., that which is produced by currents generated far from the electrode. In one embodiment, this is done by calculating the derivative of each EGM that emphasizes or extracts the rapidly changing part of the EGM signal. These signals may be used to generate a visualization of the depolarization wave on the recording surface of the heart by modulating the color and elevation of the surface by the signal depolarization wave strength. This mimics wave action that shows both the direction and speed of the wave front but also its magnitude, a measure of the viability of the cardiac cells near the electrode.

Although not required, the techniques for isolating the local depolarization wave and subsequently visualizing said wave on the recording surface of the heart is described in the general context of computer-program instructions being executed by a computing device.

Program modules generally include routines, programs, objects, components, data structures, etc., that performed the particular tasks or implement particular abstract dated types. While the systems and methods that described in the foregoing context, acts and operations described herein after may also be implemented in hardware.

Recording System and Data

For each EP procedure, two electronic systems are used to acquire data: a recording system to acquire electrical signals from electrodes touching the heart muscle simultaneously and synchronized to a second recording system that records the location in 3-dimensional coordinates of one or more electrodes. A computer is used to gather and process the data. The computer will be described later.

During an EP procedure, catheters containing multiple electrodes as well as catheters with special location sensors used to determine where in a 3-dimensional Cartesian coordinate system are located in the heart are inserted in a cavity or on the surface of the heart. At the start of the procedure, a time stamp in milliseconds is stored in the computer and EGMs from the electrodes are sampled (digitized) at a fixed sampling rate, e.g. 1000 samples per second using a specialized recording system containing conventional amplifiers, filters and digitizing electronics. Simultaneously, a specialized system processes signals from one or more location sensors, likely at a slower sampling rate, e.g. 30 samples per second. The electrical and geometric data are continuously gathered and digitized by the electrical and geometric recording systems and sampled and stored by the computer. Separate times steps for each datum define the starting time for the samples from each recording system.

Processing of Signals

Since the geometric data are sampled at a slower sampling rate, the coordinate data must be up-sampled to one sample per millisecond using simple linear interpolation. This results in geometric and electrical data that are time aligned to sample time stamps and both sampled at one millisecond intervals The velocity magnitude of the location sensing electrode is calculated. This is used to display the speed of the one or more location sensors at any time.

A reference electrical signal, e.g., a body surface electrocardiogram (ECG) such as lead V3 is used to detect all heart beats from the incoming electrical signal. The steps include calculating the first derivative (dv/dt) of the ECG signal and finding the time of minimum dv/dt which is a reliable marker of each heartbeat.

The velocity magnitude curve shows signature characteristics during each heartbeat. There are two peaks, the first associated with the contraction of the heart and the second the relaxation when the heart re-fills with blood. For each heartbeat, a computer algorithm searches a time window of 200 or more milliseconds backward in time from the beat time to determine the minimum time in the window. This identifies the time of least motion of the previous beat and occurs just prior to the next contraction of the heart. This is late diastole in the cardiac cycle.

The 3D coordinates (x,y,z) occurring at the time of minimum motion are saved and stored. A second electrode velocity is calculated from just the optimal, saved coordinates that shows the coordinates selected at the same time of the cardiac cycle.

The second velocity curve shows the systematic, periodic fluctuations of the electrode motion that represent the changes in position associated with respiration. The rapid part of the waveform occurs during inspiration and early expiration of the respiratory cycle. A computer algorithm searches for the greatest velocity peak in a time window just longer than the duration of one respiratory cycle and the searches back from that time to the minimum velocity time. The coordinates for that time are then stored as the optimal coordinates for the electrode for that respiratory cycle.

In order to ensure that coordinates and EGM data are not saved during times of moving the electrode rapidly from one location in the heart to another, thresholds for each of the two velocities, can be set to block using data for those times. These optimal coordinates are passed on to the component system that builds the geometric model of the heart surface being studied. Detailed aspects of the invention will now be described in steps.

Step 1: The first step in correcting the position coordinates for motion is to acquire the point coordinates, continuously during the procedure. As the points are acquired, one can calculate a simple velocity magnitude by taking the difference between the most recent and just previous coordinates and taking the square root of the sum of squares:

$$V_n = \sqrt{(X_n - X_{n-1})^2 + (Y_n - Y_{n-1})^2 + (Z_n - Z_{n-1})^2}$$

Where Vn is the velocity magnitude of the electrode at position Xn, Y n, Zn.

Step 2. Body Surface electrocardiograms (ECGs) are recorded simultaneously with the point coordinates. Given that the velocity magnitude curve has two times of minimum velocity, one at maximum contraction of the heart and one at maximum filling, and because these waveforms are variable from site to site in the heart, there is ambiguity in knowing which is which, especially at fast heart rates. To remedy this, an ECG having a sharp downward deflection, e.g. a precordial ECG lead, allows the detection of each beat by calculating the derivative of the ECG and using time of minimum derivative as a time to detect the beat. This is common practice.

From the time of minimum derivative of the beat, the algorithm searches backwards for a minimum ½i in the preceding 200 or 300 milliseconds. The coordinates at the time of this minimum is then noted as the position for that heartbeat.

1. Benefits/Advantages a. The primary benefit of the INVENTION is that it addresses a need to improve the process of recording and using electrode locations to build geometric models of the heart surfaces being studied.
b. Specifically, the method removes the interfering effects of motion of the heart and lungs that introduce large errors and inconsistencies in the location of the recording electrodes that can result in a very jagged, unrealistic surface.
c. In some cases, e.g. mapping atrial cavities, the electrode motion can be much earlier and larger than for that than the ventricular motion effects but the method accounts for this and selects time of least velocity prior to the QRS.
d. Present systems typically select a fixed time in each heartbeat to select coordinates, but the motion during relaxation is often larger than it is during contraction leading to errors in the measurement. Moreover, the component of the atrial contraction effect on velocity will often be missed.

Figure 1B:
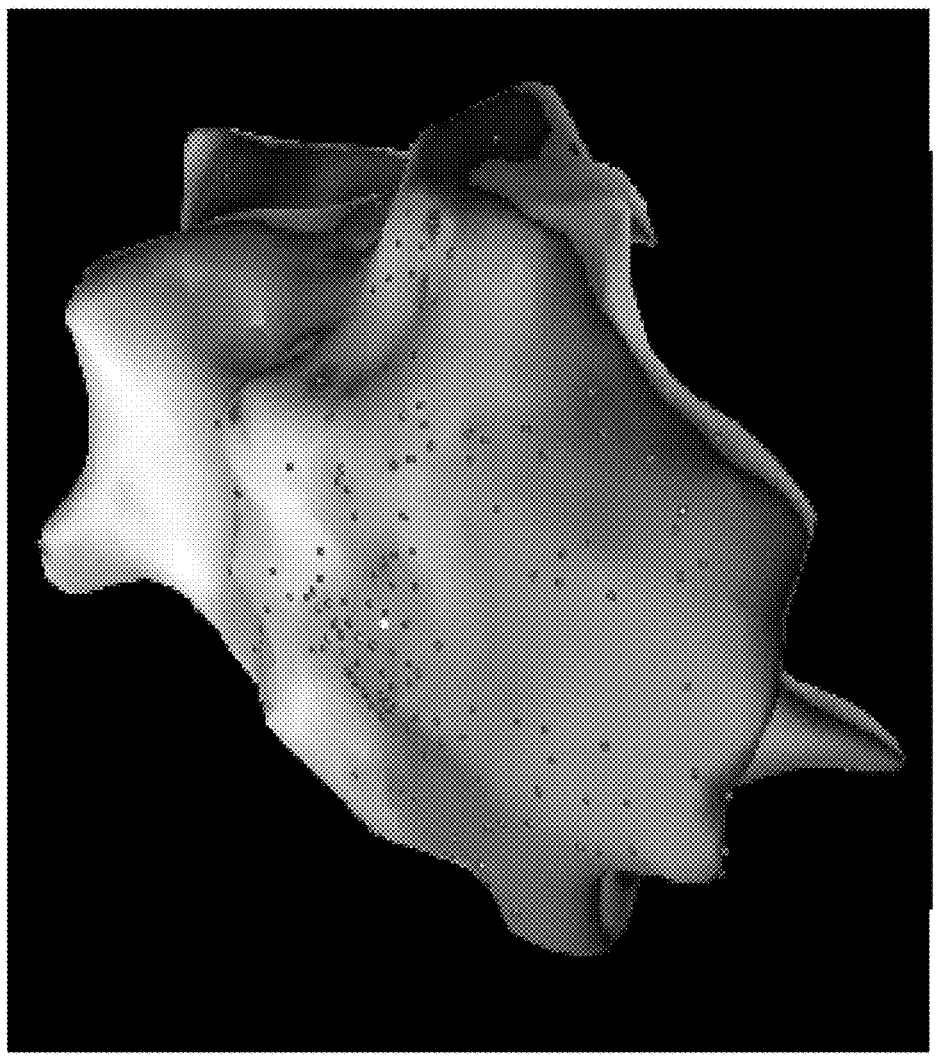
FIG. 1B shows a heart surface constructed based on the mesh of FIG. 1 *a*
Figure 2:
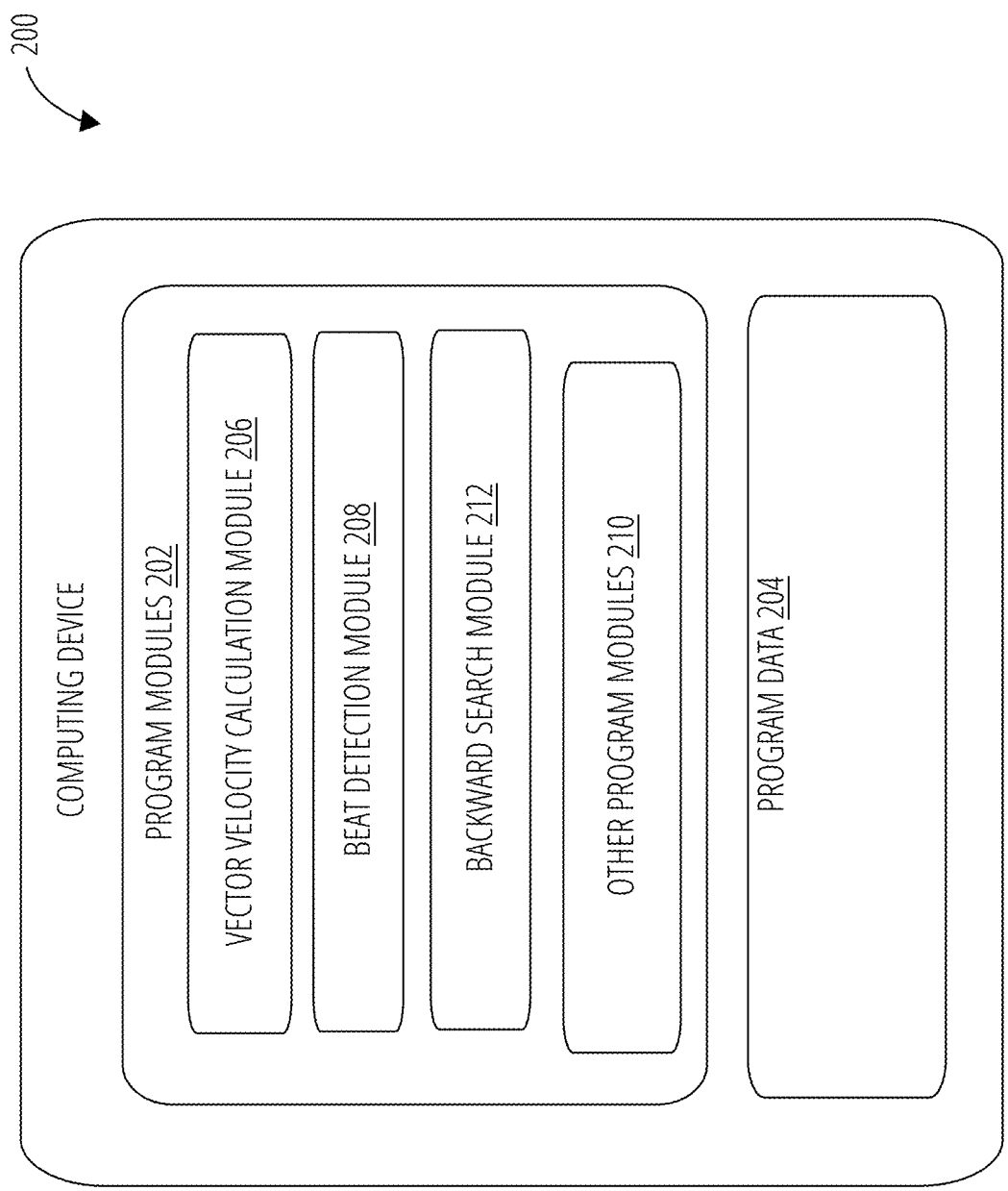
FIG. 2. exemplary system in the form of a computing device for removal of cardiac and respiratory motion from geometric points acquired from cardiac catheter electrodes in accordance with one embodiment.
Figure 3:
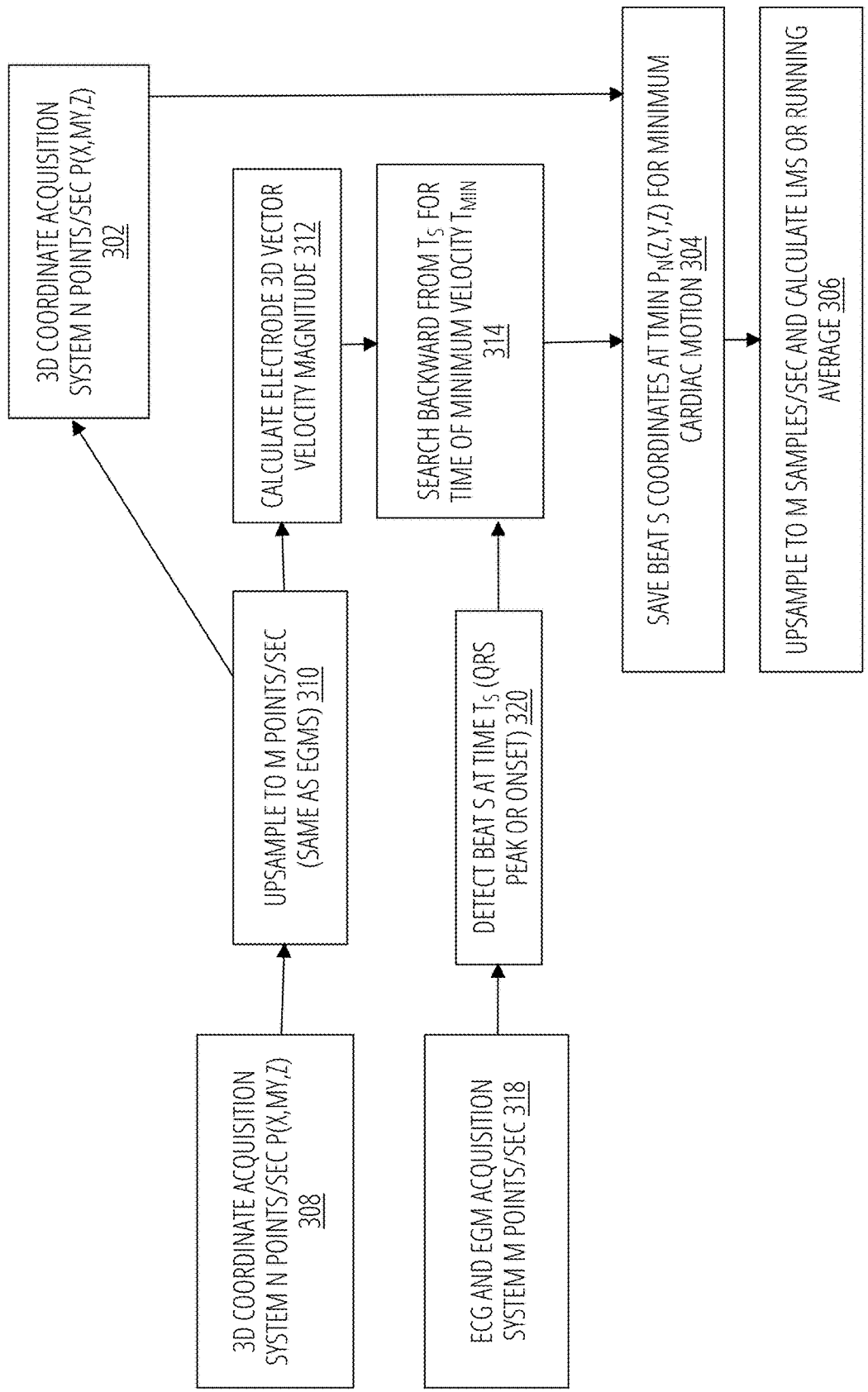
FIG. 3 is a flowchart of operations for removal of cardiac and respiratory motion from geometric points acquired from cardiac catheter electrodes

FIG. 1 shows an exemplary system in the form of a computing device 100 for visualizing the depolarization wave, in accordance with one embodiment of the invention. Computing device 102 may represent any type of computing device such as a laptop, server, etc. Computing device 100 comprises program modules 102 and program data 104.

Program modules 102 may comprise, for example, dvt/dt calculation module 106 and surface construction calculation module 108, and other program modules 110 such as an operating system, etc.

In use, computing device 100 may form part of a cardiac mapping system 400 (which is described later with reference to FIG. 1) and is configured to receive electrocardiogram (ECG) signals and electrophysiological data for a heart. Cardiac mapping system 400 is configured to first select a set of surface electrodes and then drives them with current pulses. While the current pulses are being delivered, electrical activity, such as the voltages measured at least one of the remaining surface electrodes and in vivo electrodes are measured and stored.

In accordance with one embodiment of the invention, cardiac mapping system 400 also includes an electrocardiogram system (not shown) to generate electrocardiograms (ECGs) for a patient. The system 400 also generates electrophysiological (EP) data in the form of EP data points each comprising a recording location within the heart (specified in terms of X, Y, and Z coordinates) and a voltage reading recorded at said location. Thus, each voltage measurement may be associated with position data comprising the spatial location within the heart at which the voltage measurement was made.

Figure 4:
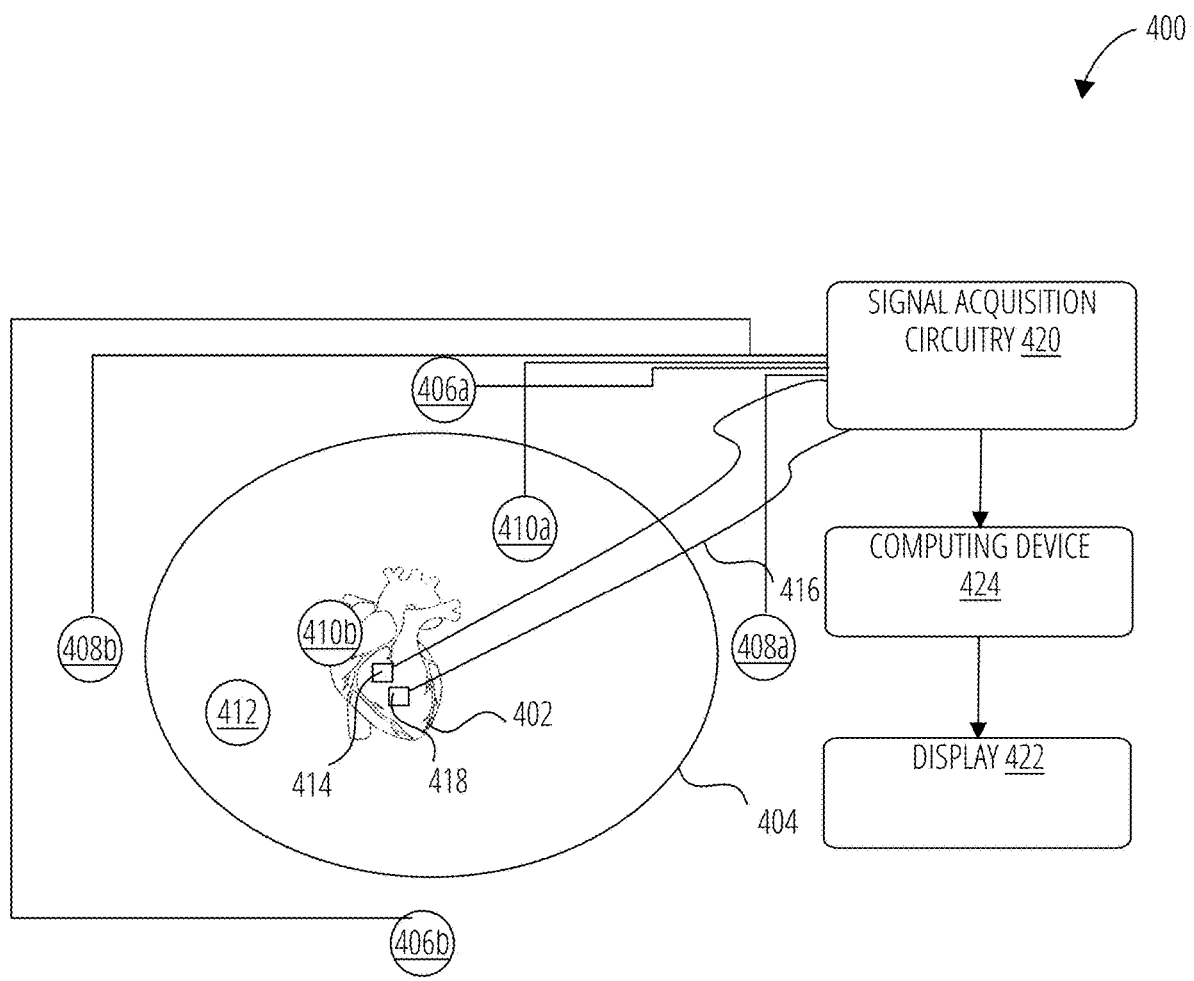
FIG. 4 illustrates a schematic drawing of a cardiac mapping system for removal of cardiac and respiratory motion from geometric points acquired from cardiac catheter electrodes in accordance with one embodiment.

FIG. 4 which shows a schematic diagram of a cardiac mapping system 400 for conducting cardiac electrophysiology studies by navigating a cardiac catheter and measuring electrical activity occurring in a heart 402 of a patient 404 and three-dimensionally mapping the electrical activity and/or information related to or representative of the electrical activity. Cardiac mapping system 400 can be used to help create an anatomical model using one or more electrodes. Cardiac mapping system 400 can also be used to measure electrophysiology data at a plurality of points along a cardiac surface and store the measured data in association with location information for each measurement point at which the electrophysiology data was measured.

The cardiac mapping system 400 comprises a computing device 100, X-axis surface electrodes 406a, 406b, Y-axis surface electrodes 408a, 408b, Z-axis surface electrodes 410a, 410b, surface reference electrode 412, fixed intra-cardiac electrode 414, mapping catheter 416, mapping electrode 418, signal acquisition circuitry 420, and a display 422.

The surface electrodes (e.g., patch electrodes) are shown applied to a surface of patient 404 along an X-axis, a Y-axis, and a Z-axis. Surface reference electrode 412 provides a reference and/or ground electrode for the cardiac mapping system 400. Surface reference electrode 412 may be an alternative to fixed intra-cardiac electrode 414. It should also be appreciated that, in addition, the patient 404 will have most or all of the conventional electrocardiogram (ECG) system leads in place. This ECG information is available to cardiac mapping system 400 although not illustrated in the FIG. 4.

In one embodiment, the localization/mapping system is the EnSite NavX™ navigation and visualization system of St. Jude Medical, Atrial Fibrillation Division, Inc. Other localization systems, however, may be used in connection with the present invention, including for example, the CARTO navigational and location system of Biosense Webster, Inc. and the LOCALISA intracardiac navigation system of Medtronic, Inc. The localization and mapping systems described in the following patents (all of which are hereby incorporated by reference in their entireties) can be used with the present invention: U.S. Pat. Nos. 6,990,370; 6,978,168; 6,947,785; 6,939,309; 6,728,562; 6,640,119; and 5,983,126.

Each surface electrode is coupled to the multiplex switch of signal acquisition circuitry 420 and the pairs of electrodes are selected by software running on computing device 100, which couples the electrodes to a signal generator of the signal acquisition circuitry 420. Computing device 100, for example, may comprise a conventional general-purpose computer, a special-purpose computer, a distributed computer, or any other type of computer. The computing device 100 may comprise one or more processors, such as a single central-processing unit, or a plurality of processing units, commonly referred to as a parallel processing environment.

Generally, three nominally orthogonal electric fields are generated by a series of driven and sensed electric dipoles in order to realize catheter navigation in a biological conductor. Alternately, these orthogonal fields can be decomposed and any pairs of surface electrodes can be driven as dipoles to provide effective electrode triangulation. Additionally, such nonorthogonal methodologies add to the flexibility of the system. For any desired axis, the potentials measured across a fixed intra-cardiac electrode 414 resulting from a predetermined set of drive (source-sink) configurations are combined algebraically to yield the same effective potential as would be obtained by simply driving a uniform current along the orthogonal axes.

Any two of the surface electrodes may be selected as a dipole source and drain with respect to a ground reference, e.g., the surface reference electrode 412 while the unexcited electrodes measure voltage with respect to the ground reference. The mapping/measurement electrode 418 placed in the heart 402 is exposed to the field from a current pulse and is measured with respect to ground, e.g., the surface reference electrode 412. In practice the catheters within the heart may contain multiple electrodes and each electrode potential may be measured. As previously noted, at least one electrode may be fixed to the interior surface of the heart to form a fixed intra-cardiac electrode 414, which is also measured with respect to ground. Data sets from each of the surface electrodes, the internal electrodes, and the virtual electrodes may all be used to determine the location of the measurement electrode 418 or other electrodes within the heart 402.

In summary, the cardiac mapping system 400 first selects a set of surface electrodes and then drives them with current pulses. While the current pulses are being delivered, electrical activity, such as the voltages measured at least one of the remaining surface electrodes and in vivo electrodes are measured and stored. At this point, compensation for artifacts, such as respiration and/or impedance shifting may be performed as indicated above. As described above, various location data points are collected by the cardiac mapping system 400 that are associated with multiple electrode locations (e.g., endocardial electrode locations). Each point in the set has coordinates in space.

Figure 5:
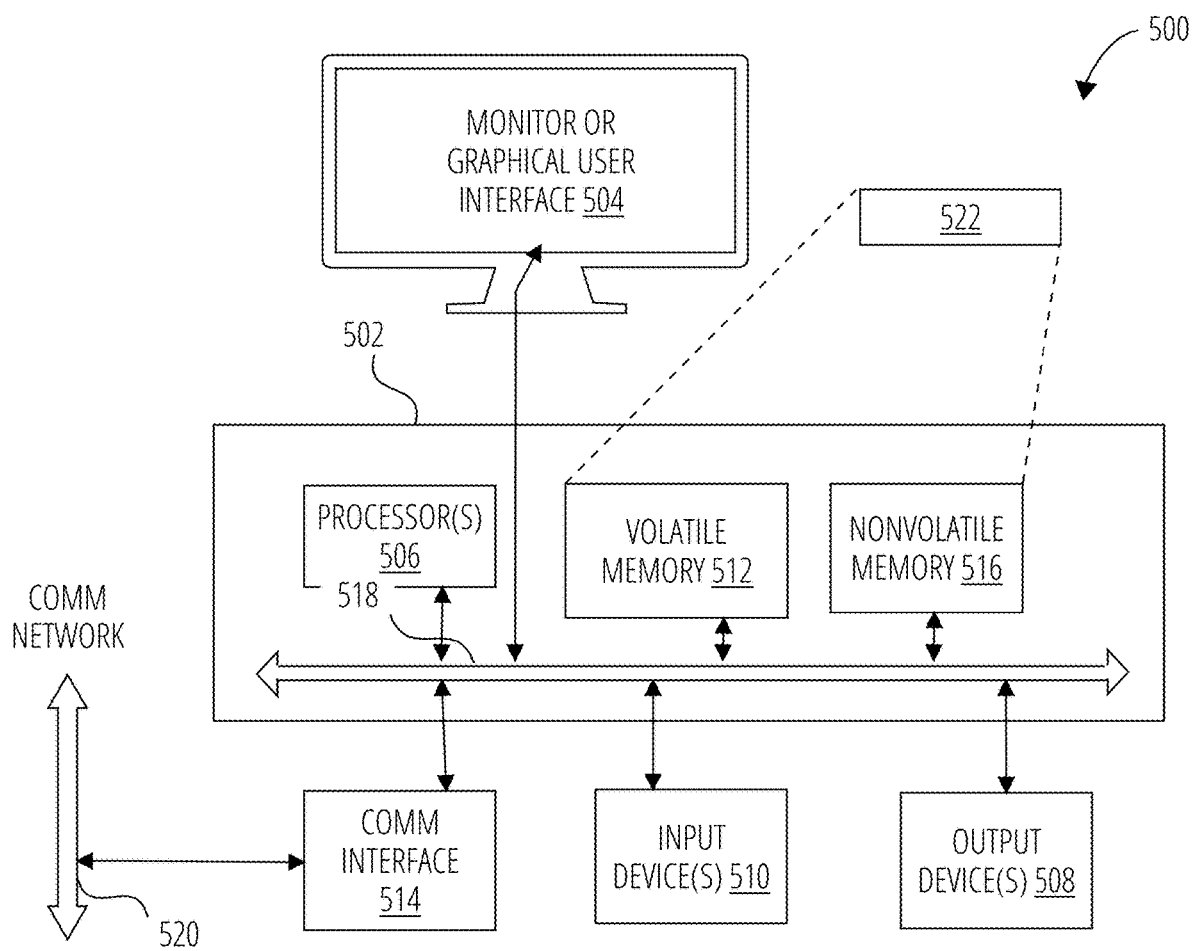
FIG. 5 is an example block diagram of a computing device 100 that may incorporate embodiments of the present invention.

FIG. 5 is an example block diagram of hardware for the computing device 100 in accordance with one embodiment of the present invention. FIG. 5 is merely illustrative of a machine system to carry out aspects of the technical processes described herein and does not limit the scope of the claims. One of ordinary skill in the art would recognize other variations, modifications, and alternatives. In one embodiment, the computing device 100 typically includes a monitor or graphical user interface 504, a data processing system 502, a communication network interface 514, input device(s) 510, output device(s) 513, and the like.

As depicted in FIG. 5, the data processing system 502 may include one or more processor(s) 506 that communicate with a number of peripheral devices via a bus subsystem. These peripheral devices may include input device(s) 510, output device(s), communication network interface 514, and a storage subsystem, such as a volatile memory 512 and a nonvolatile memory 516.

The volatile memory 512 and/or the nonvolatile memory 516 may store computer-executable instructions and thus forming logic 522 that when applied to and executed by the processor(s) 506 implement embodiments of the processes disclosed herein.

The input device(s) 510 include devices and mechanisms for inputting information to the data processing system 502. These may include a keyboard, a keypad, a touch screen incorporated into the monitor or graphical user interface 504, audio input devices such as voice recognition systems, microphones, and other types of input devices. In various embodiments, the input device(s) 510 may be embodied as a computer mouse, a trackball, a track pad, a joystick, wireless remote, drawing tablet, voice command system, eye tracking system, and the like. The input device(s) 510 typically allow a user to select objects, icons, control areas, text and the like that appear on the monitor or graphical user interface 504 via a command such as a click of a button or the like.

The output device(s) 508 include devices and mechanisms for outputting information from the data processing system 502. These may include the monitor or graphical user interface 504, speakers, printers, infrared LEDs, and so on as well understood in the art.

The communication network interface 514 provides an interface to communication networks (e.g., communication network 520) and devices external to the data processing system 502. The communication network interface 514 may serve as an interface for receiving data from and transmitting data to other systems. Embodiments of the communication network interface 514 may include an Ethernet interface, a modem (telephone, satellite, cable, ISDN), (asynchronous) digital subscriber line (DSL), FireWire, USB, a wireless communication interface such as BlueTooth or WiFi, a near field communication wireless interface, a cellular interface, and the like.

The communication network interface 514 may be coupled to the communication network 520 via an antenna, a cable, or the like. In some embodiments, the communication network interface 514 may be physically integrated on a circuit board of the data processing system 502, or in some cases may be implemented in software or firmware, such as "soft modems", or the like.

The computing device 200 may include logic that enables communications over a network using protocols such as HTTP, TCP/IP, RTP/RTSP, IPX, UDP and the like.

The volatile memory 512 and the nonvolatile memory 516 are examples of tangible media configured to store computer readable data and instructions to implement various embodiments of the processes described herein. Other types of tangible media include removable memory (e.g., pluggable USB memory devices, mobile device SIM cards), optical storage media such as CD-ROMS, DVDs, semiconductor memories such as flash memories, non-transitory read-only-memories (ROMS), battery-backed volatile memories, networked storage devices, and the like. The volatile memory 512 and the nonvolatile memory 516 may be configured to store the basic programming and data constructs that provide the functionality of the disclosed processes and other embodiments thereof that fall within the scope of the present invention.

Logic 522 that implements embodiments of the present invention may be stored in the volatile memory 512 and/or the nonvolatile memory 516. Said logic 522 may be read from the volatile memory 512 and/or nonvolatile memory 516 and executed by the processor(s) 506. The volatile memory 512 and the nonvolatile memory 516 may also provide a repository for storing data used by the logic 522.

The volatile memory 512 and the nonvolatile memory 516 may include a number of memories including a main random-access memory (RAM) for storage of instructions and data during program execution and a read only memory (ROM) in which read-only non-transitory instructions are stored. The volatile memory 512 and the nonvolatile memory 516 may include a file storage subsystem providing persistent (non-volatile) storage for program and data files. The volatile memory 512 and the nonvolatile memory 1316 may include removable storage systems, such as removable flash memory.

The bus subsystem 518 provides a mechanism for enabling the various components and subsystems of data processing system 502 communicate with each other as intended. Although the communication network interface 514 is depicted schematically as a single bus, some embodiments of the bus subsystem 518 may utilize multiple distinct busses.

It will be readily apparent to one of ordinary skill in the art that the computing device 200 may be a device such as a smartphone, a desktop computer, a laptop computer, a rack-mounted computer system, a computer server, or a tablet computer device. As commonly known in the art, the computing device 200 may be implemented as a collection of multiple networked computing devices. Further, the computing device 200 will typically include operating system logic (not illustrated) the types and nature of which are well known in the art.

Terms used herein should be accorded their ordinary meaning in the relevant arts, or the meaning indicated by their use in context, but if an express definition is provided, that meaning controls.

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" in this context refers to software logic embodied as processor-executable instructions stored in read-only memories or media.

"Hardware" in this context refers to logic embodied as analog or digital circuitry.

"Logic" in this context refers to machine memory circuits, non-transitory machine-readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Software" in this context refers to logic implemented as processor-executable instructions in a machine memory (e.g. read/write volatile or nonvolatile memory or media).

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Core pending US patent application number 63/267,806 is incorporated herein by reference

The invention claimed is:

1. A method for processing at least one electrical signal received from a mapping catheter electrode during cardiac mapping of a patient's heart:
   processing the at least one electrical signal to identify a heartbeat in the signal at a time t;
   analyzing a portion of the at least one electrical signal prior to a detected heartbeat to identify a time t' when motion of the mapping catheter electrode is at a minimum; and selecting a catheter position for the heartbeat as the position of the catheter at the time t';
   displaying, using a display device, the selected catheter position; and
   for a heartbeat, searching, by a backward search module, a time window associated with a time value backward in time from t to determine a minimum time value associated with the time window.

2. The method of claim 1, when analyzing the portion of the at least one electrical signal comprises
   calculating a velocity for the mapping catheter electrode; and identifying t' as the time at which said velocity is at a minimum.

3. The method of claim 2, further comprising:
   blocking one or more thresholds associated with the velocity.

4. The method of claim 1, further comprising
   identifying t' for a plurality of respiratory cycles; averaging t' over the plurality of respiratory cycles; and using an average value for t' in the catheter selection step.

5. The method of claim 4, further comprising:
   for a respiratory cycle, searching a time window associated with a time value backward in time from a duration of a respiratory cycle.

6. The method of claim 1, further comprising:
   up-sampling coordinate data.

7. A method for at least reducing motion artifacts in electrical readings generated by a mapping catheter inserted into a patient's heart during a cardiac mapping procedure, comprising:
   from positional data associated with a mapping catheter electrode, determining a motion velocity vector for the mapping catheter electrode;
   from the electrical readings selecting a heartbeat that occurred at time t corresponding to a mapping catheter electrode position P;
   compensating for motion of the mapping catheter electrode comprising associating a new mapping catheter electrode position with the heartbeat, wherein said new mapping catheter electrode position is selected as that position of the mapping catheter electrode determined to be free of motion artifacts; and
   for a heartbeat, searching, by a backward search module, a time window associated with a time value backward in time from t to determine a minimum time value associated with the time window.

8. The method of claim 7, further comprising
   determining the new mapping catheter electrode position to be that position of the mapping catheter electrode corresponding to that time t' before the heartbeat at which a motion velocity vector computed for the mapping catheter electrode is determined to be at a minimum value.

9. The method of claim 8, further comprising
   calculating several values for t' over a plurality of cardiac cycles; and using an average of the values for t' to determine the new mapping catheter electrode position.

10. The method of claim 7, further comprising:
    up-sampling coordinate data.

11. The method of claim 7, further comprising:
    blocking one or more thresholds associated with the velocity vector.

12. The method of claim 7, further comprising:
    for a respiratory cycle, searching a time window associated with a time value backward in time from a duration of a respiratory cycle.

13. A system for cardiac mapping, comprising:
    a heartbeat detection unit to detect a heartbeat in electrical signals received from a mapping catheter electrode;
    processing at least one electrical signal to identify a heartbeat in the signal at a time t;
    a mapping unit to associate a spatial position with the detected heartbeat; and
    a motion correction unit to selectively remap the spatial position associated with the detected heartbeat to a new spatial position corresponding to a position of the mapping catheter electrode prior to any offset due to motion; and
    a backward search module to search, for a heartbeat, a time window associated with a time value backward in time from t to determine a minimum time value associated with the time window.

14. The system of claim 13, wherein the motion is selected from the group consisting of cardiac motion and respiratory motion.

15. The system of claim 14, wherein the new spatial position of the mapping catheter electrode corresponds to a time at which the mapping catheter electrode is determined to be stationary.

16. The system of claim 15, wherein the mapping catheter electrode is determined to be stationary when its velocity is at a minimum.

17. The system of claim 16, further comprising:
blocking one or more thresholds associated with the velocity.

18. The system of claim 13, further comprising:
up-sampling coordinate data.

19. The system of claim 13, further comprising:
for a respiratory cycle, searching a time window associated with a time value backward in time from a duration of a respiratory cycle.

\* \* \* \* \*